United States Patent [19]
Radke et al.

[11] 3,868,126
[45] Feb. 25, 1975

[54] PLURAL INFLATION FOR SAFETY DEVICE

[75] Inventors: Donald G. Radke; Donald J. Lewis, both of Troy, Mich.

[73] Assignee: Allied Chemical Corporation, New York, N.Y.

[22] Filed: Oct. 27, 1971

[21] Appl. No.: 192,971

[52] U.S. Cl. ......... 280/150 AB, 180/103, 200/81.8, 200/82 R, 222/3, 137/255
[51] Int. Cl. ............................................. B60r 21/08
[58] Field of Search ............. 280/150 AB; 180/103; 200/81 R, 81.8

[56] References Cited
UNITED STATES PATENTS

| | | | |
|---|---|---|---|
| 2,390,643 | 12/1945 | DeBeaumont | 200/81.8 |
| 3,336,045 | 8/1967 | Kobori | 280/150 AB |
| 3,602,527 | 8/1971 | Goetz | 280/150 AB |
| 3,722,528 | 3/1973 | Fiala | 280/150 AB |
| 3,744,815 | 7/1973 | Scherenberg | 280/150 AB |

Primary Examiner—David Schonberg
Assistant Examiner—John P. Silverstrim
Attorney, Agent, or Firm—Ernest D. Buff; Jonathan Plaut

[57] ABSTRACT

Apparatus for successively inflating a bag with gas from a plurality of sources disposed in a vehicle subject to a plurality of collisions occurring in short intervals. Upon initial impact of the vehicle, an electrical current is directed from a power source to a primary gas source. Gas released from the primary gas source upon receipt of the electrical current passes into the bag which inflates to protect occupants or other mobile objects within the vehicle. Upon a second impact of the vehicle, the electrical current is directed from the power source to a secondary gas source, which operates in the same manner as the primary gas source to reinflate the bag. Additional gas sources may similarly be provided to accommodate subsequent impacts.

28 Claims, 6 Drawing Figures

PATENTED FEB 25 1975

INVENTORS
DONALD G. RADKE
DONALD J. LEWIS
BY
*Ernest W. Buff*
ATTORNEY

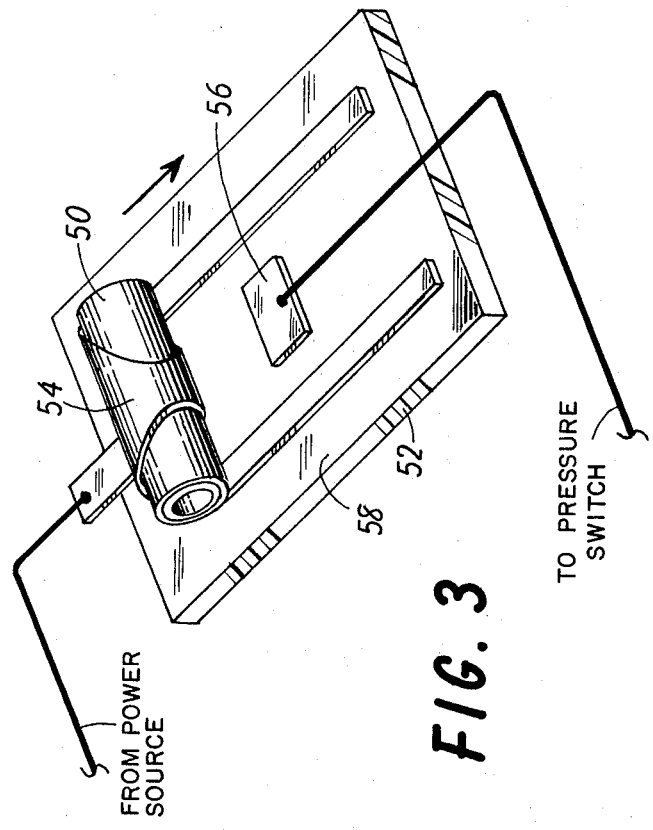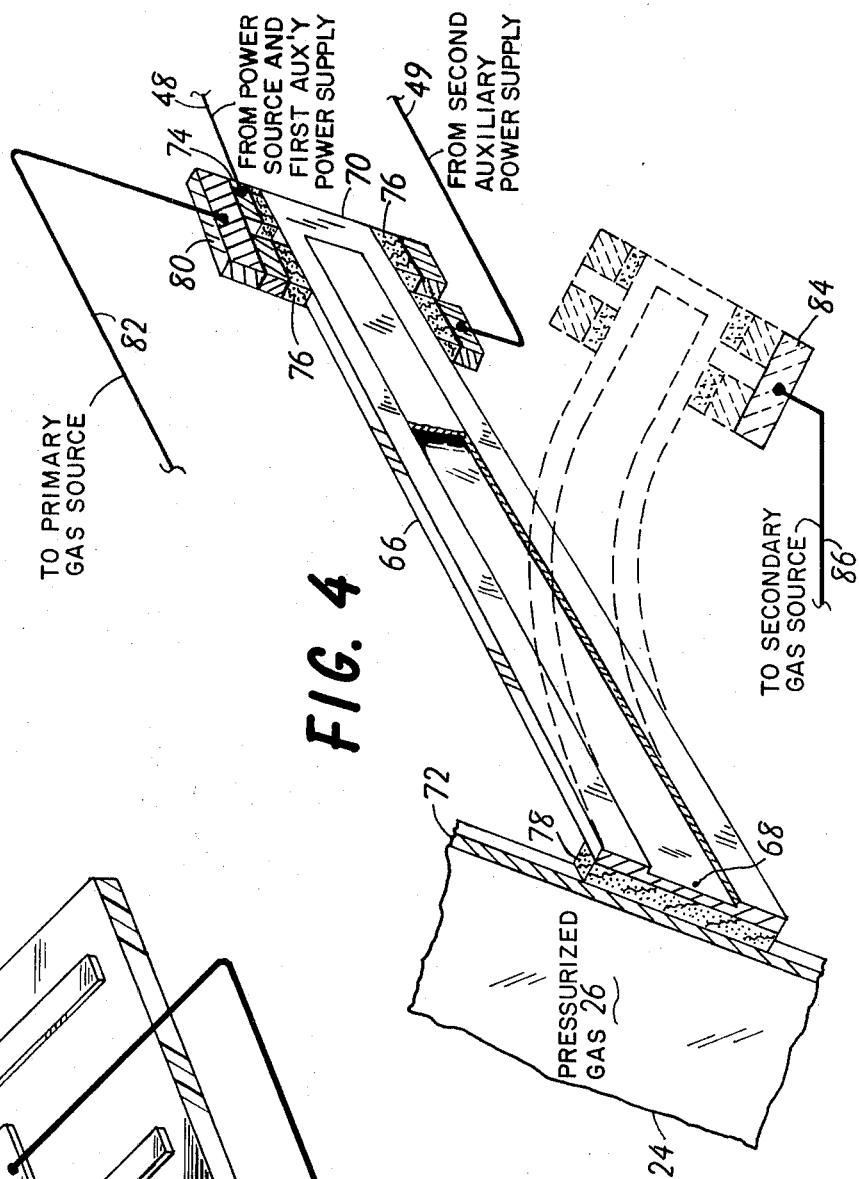

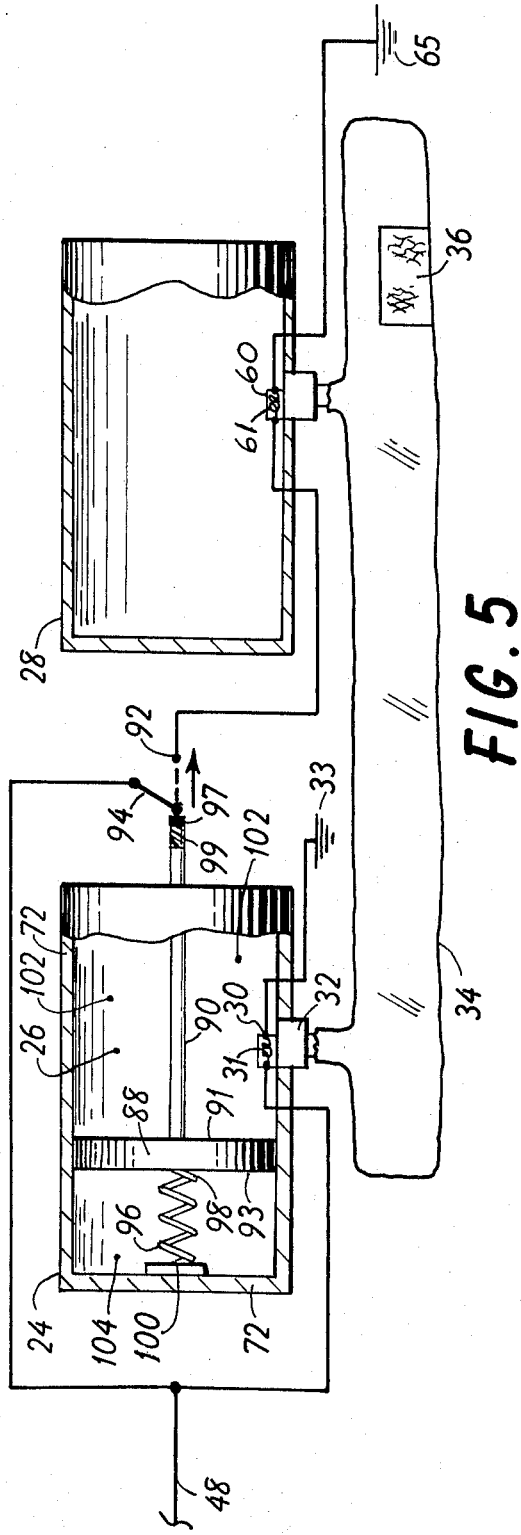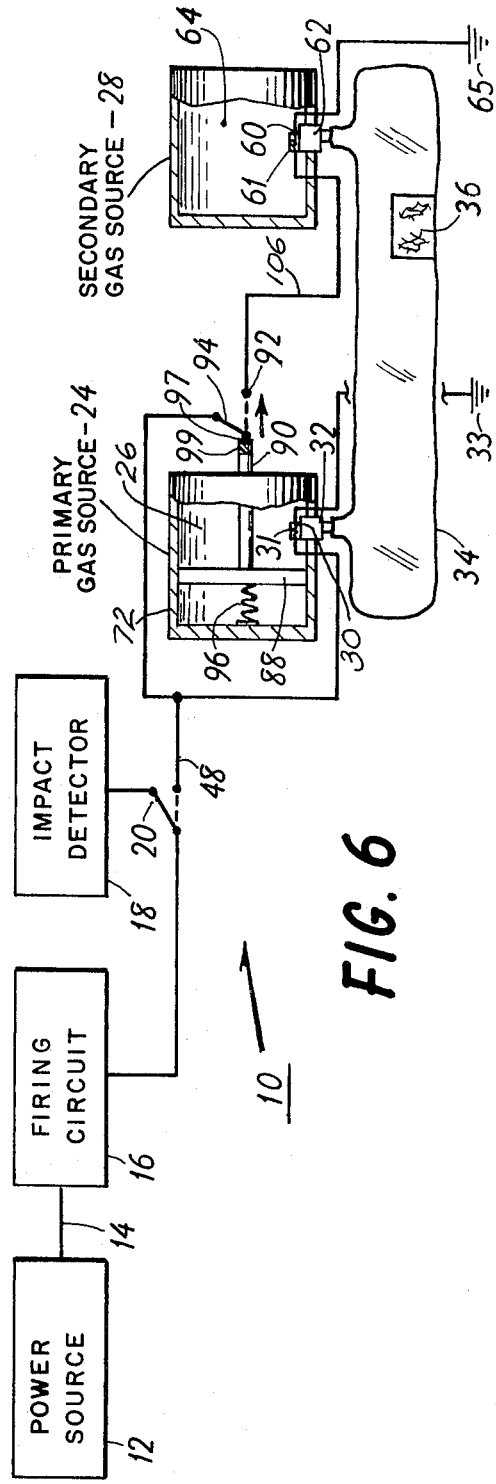

PLURAL INFLATION FOR SAFETY DEVICE

BACKGROUND OF THE INVENTION

1. Field of the Invention

This invention relates to a safety device for vehicle passengers, and more particularly to apparatus for inflating a bag with gas upon impact of a vehicle in which the apparatus is disposed, whereby the bag reinflates if the vehicle is involved in a subsequent impact.

2. Description of the Prior Art

Bag inflation apparatus of the type upon which this invention has improved frequently includes a gas source disposed within a vehicle, and apparatus connected to the gas source for creating an outlet therein when the vehicle is involved in an impact. The outlet communicates with an inflatable bag. Gas flows from the gas source through the outlet and into the bag which is rapidly inflated by the gas. The bag is generally comprised of a suitable fabric, a portion of which is provided with sufficient porosity to permit some of the inflating gas which enters the bag to pass through the porous portion and out of the bag. In this manner the bag can be made to collapse at a preselected rate. One of the major problems to be overcome in such apparatus is that the inflated bag is collapsed by the occupant during the first impact and is therefore not able to provide adequate occupant protection if the vehicle is involved in a subsequent impact. The present invention provides a means whereby the aforesaid problem is overcome.

SUMMARY OF THE INVENTION

Briefly stated, the invention provides a means for inflating a bag with gas from a primary gas source upon impact of a vehicle, in which the apparatus is disposed and for reinflating the bag with gas from a secondary source if the vehicle is involved in a subsequent impact. The primary gas source supplies a gas having a preselected minimum pressure, and is selected from the inflator group consisting of pressurized gas, gas developed by combustion of a gas generating material, or a hybrid combination of the same. The secondary gas source supplies a gas selected from the group consisting of pressurized gas, gas developed by combustion of gas generating material and mixtures thereof. A first gas releasing means is connected to the primary gas source and to the bag. A second gas releasing means is connected to the secondary gas source and to the bag. The first and second gas releasing means respectively permit gas from the primary and secondary gas sources to flow into the bag upon receipt of the electrical current. A power source is provided for supplying an electrical current to a circuit means. The circuit means is electrically connected to an impact detecting means, which causes the current to flow through the circuit means upon impact of the vehicle. A pressure sensitive control means is electrically connected to the circuit means and responsive to the pressure of gas within the primary gas source. In a first embodiment of the invention, the pressure sensitive control means electrically connects the first gas releasing means to the circuit means prior to an impact of the vehicle, and electrically connects the second gas releasing means to the circuit means after the impact. In a second embodiment of the invention, the primary gas source is electrically connected to the circuit means, both before and after an impact of the vehicle, and the pressure sensitive control means additionally connects the circuit means to the second gas releasing means after the impact. Gas released from the primary and secondary gas sources flows into an inflatable bag which is sequentially inflated and reinflated by the gas.

More specifically, the first embodiment of the invention includes a pressure sensitive control means comprising a flexible tube having an open end and a closed end. The tube is structurally connected to the primary gas source so that the open end of the tube communicates with the pressurized gas of the primary gas source. The closed end of the tube is electrically connected to the circuit means. When gas within the tube is maintained above a preselected minimum pressure, the tube is substantially straight and the closed end of the tube contacts a first electroconductive member electrically connected to the primary gas source. The tube is especially constructed to assume an arcuate form if the gas pressure within the tube falls below the preselected minimum pressure. When in the arcuate form, the tube contacts a second electroconductive member electrically connected to the secondary gas source.

Normally, the pressure of gas within the primary source is sufficient to cause the pressurized gas to enter and straighten the tube. The closed end of the tube contacts the first electroconductive member and electrically connects the primary source to the circuit means. When a vehicle equipped with the above described apparatus is involved in an impact, an electrical current is transmitted from the power source through the circuit means, the tube and the first electroconductive member to the primary gas source. An electroexplosive device within the primary gas source comprising part of a first gas releasing means is detonated upon receipt of the electrical current, whereupon an outlet is created in the primary gas source. The electrical current may be transmitted through a single electrical path to the electroexplosive device, or through a plurality of electrical paths to preselected portions of the primary gas source. In either case, gas released from the primary gas source by the first gas releasing means upon receipt of the electrical current flows through the outlet and into a shockabsorbing bag or cushion which is disposed between hard portions of the vehicle and passengers or other mobile objects contained therein.

The gas pressure within the primary gas source tends to decrease as the bag inflates. When the bag is fully inflated the pressure of gas within the primary source and within the tube is below the preselected minimum pressure, and is no longer sufficient to counteract forces tending to cause the tube to assume an arcuate shape. The tube moves from a relatively straight configuration to the arcuate form and an electrical connection between the circuit means and the secondary gas source is achieved. If the vehicle becomes involved in a second impact, an electrical current is transmitted from the power source through the circuit means, the tube and the second electroconductive member of the secondary gas source, which can be operated in the same manner as the primary gas source to reinflate the bag.

In the second embodiment of the invention, the primary gas source is electrically connected to the circuit means and includes a piston slideably disposed within a hollow housing, so that the peripheral edges of the piston are in continuous contact with the housing. A first face of the piston is connected to one end of a shaft extending in the direction of an electrically conductive component. The electrically conductive component is electrically connected to the secondary gas source. A second face of the piston is connected to one of a spring. The other end of the spring is connected to the housing so that the spring is compressed when the piston and the shaft are displaced toward the spring. An electrically conductive element is electrically connected to the circuit means and structurally connected to the other end of the shaft. The conductive component is electrically insulated from the shaft by an insulating element. The conductive component is fixedly located relative to the conductive element at the end of the shaft so as to permit the conductive element to contact the conductive component when the shaft is displaced in the direction of the conductive component. Gas stored under pressure within a compartment formed by the first face of the shaft and the housing displaces the piston in the direction of the spring. The spring exerts sufficient force against the piston to displace the shaft into contact with the electroconductive component when the pressure of gas stored within the compartment falls below a preselected minimum pressure.

When a vehicle equipped with the above described apparatus is involved in an impact, an electrical current is transmitted from the power source through the circuit means to the primary gas source. An electroexplosive device within the primary gas source is detonated upon receipt of the electrical current, whereupon an outlet is created in the primary gas source. As noted in connection with the first embodiment of the invention, the electrical current may be transmitted through a single electrical path to the electroexplosive device, or through a plurality of electrical paths to preselected portions of the primary gas source. In either case, gas released from the primary gas source flows through the outlet and into a shock-absorbing bag or cushion. The gas pressure within the primary gas source tends to decrease as the bag inflates. As the pressure of gas within the primary gas source decreases the force exerted on the piston by the spring tends to displace the piston and the shaft in the direction of the electrically conductive component. If, however, the pressure of gas stored within the primary gas source is at least as great as a preselected minimun pressure, the piston and the shaft will not be displaced a distance sufficient to permit the conductive element to contact the conductive component. When the bag has been fully inflated, the pressure of gas within the primary gas source falls below the preselected minimum pressure and is no longer sufficient to prevent the spring from displacing the piston and shaft a sufficient distance to electrically connect the conductive element with the conductive component. If the vehicle becomes involved in a subsequent impact, an electrical current is transmitted from the power source through the circuit means, the conductive element, and the conductive component to the secondary gas source, which can be operated in the same manner as the primary gas source to reinflate the bag.

The structure of the first and second embodiments can be adapted to provide for movement of the tube or of the piston and shaft upon generation of gas within the primary gas source. Latch means, for example, can be used which cooperate with the tube or the piston and shaft to hold such components in the positions to which they are respectively displaced by generation of the gas. Accordingly, the system can be modified to provide for reinflation of the bag upon a subsequent impact in the event that the gas source contains solely a gas generating material.

BRIEF DESCRIPTION OF THE DRAWINGS

The invention will be more fully understood and further advantages will become apparent when reference is made to the following detailed description of the preferred embodiment of the invention and the accompanying drawings in which:

FIG. 3 is a isometric view of the impact detector of FIGS. 1 and 2, including an electrically conductive material and a conductive element.

FIG. 4 is a sectional side elevation of means for selectively directing current from a power source to either the primary or the secondary gas sources of FIGS. 1 and 2.

FIG. 5 is a sectional side elevation of an alternate means for selectively directing current from a power source to either the primary or the secondary gas source of FIGS. 1 and 2.

FIG. 6 diagrammatically represents the apparatus of FIG. 1, incorporating the means of FIG. 5.

DESCRIPTION OF THE PREFERRED EMBODIMENTS

Figure 1:
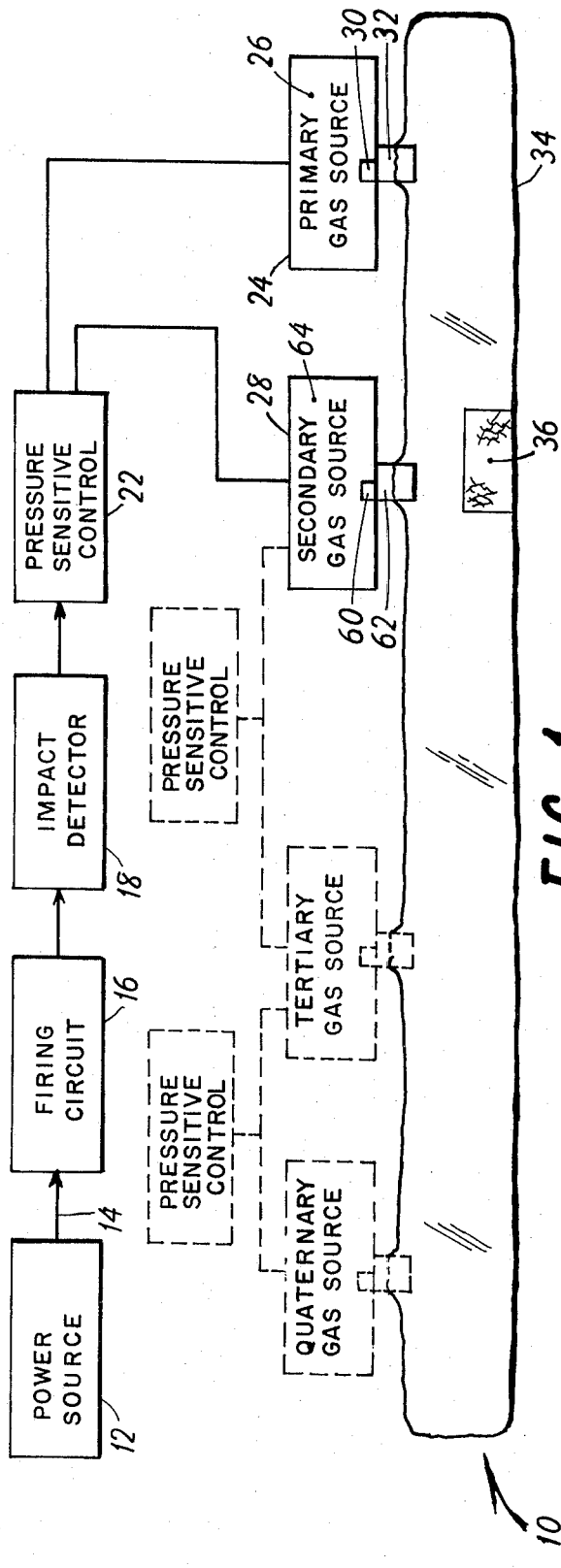
FIG. 1 is a diagrammatic representation of apparatus for inflating and reinflating a bag consecutively when a vehicle in which the apparatus is disposed is involved in consecutive impacts.

Referring to the drawings, there is illustrated in FIG. 1 a preferred form of apparatus for inflating and reinflating a bag consecutively when a vehicle equipped with the apparatus is involved in consecutive impacts. The apparatus, shown generally at 10, includes a power source 12, which may comprise a battery of the type conventionally used in a motor vehicle. An auxiliary power supply, such as a capacitor connected in parallel to the battery may be used as the power source in the event that the battery is not supplying power to the system. Under normal operating conditions, an electrical current 14 flows from the power source 12 through firing circuit 16 and back to the power source 12. When the vehicle in which apparatus 10 is disposed is involved in a collision, impact detector 18 directs current 14 by switch means shown at 20 in FIG. 2, to a pressure sensitive control 22. The pressure sensitive control 22 directs current 14 to a primary gas source 24. If the pressure of gas 26 stored within the primary gas source 24 falls below a preselected minimum pressure, control 22 directs current 14 to a secondary gas source 28. Gas released from either the primary or secondary gas source upon receipt of the electrical current passes into a bag or cushion which inflates to provide a shock absorbing medium between hard portions of the vehicle and passengers or other mobile objects disposed therein.

The primary and secondary gas sources may each respectively utilize a pressurized gas alone or in combination with a gas generating material. Such pressurized gas or gas generating material can be housed within a container having means for releasing the pressurized gas or gas developed by combustion of the gas generating material from the container upon receipt of the electrical current 14. Generally, the primary and secondary gas source need not utilize a pressurized gas, but may employ solely a gas generating material. In the event that the tertiary and quaternary gas sources shown by broken lines in FIG. 1 are employed, the secondary and tertiary gas source may utilize either a pressurized gas or a hybrid combination of pressurized gas and a gas generating material. The tertiary and quaternary gas source could, however, employ solely a gas generating material. In a preferred embodiment of the invention, each of the primary and secondary gas sources utilizes at least some pressurized gas. Nitrogen or other suitable gas which can be stored under pressure for prolonged periods without leaking from a gas containing vessel is generally used as the pressurized gas. The volume and pressure of the stored gas will depend upon the volume of the bag, the pressure to which it is filled, and the volume of gas produced by the gas generating material, in combination with its heat liberation. Preferably, the volume and pressure of the stored gas is at least about 25 percent of the volume and pressure of gas generated by combustion of the gas generating material. Black powder, nitrocellulose, composite propellants or other material which generates gas and heat upon combustion can be used as the gas generating material.

Although the invention will be described hereinafter with reference to release of a pressurized gas from the respective gas sources, it should be understood that any one of the gas sources may include a first portion comprising pressurized gas and a second portion comprising gas generating material. Moreover, for one or more gas sources comprising a first portion of pressurized gas and a second portion of pressurized gas or gas generating material, the current 14 can be transmitted through a first circuit means to the first portion of the gas source during a fixed time interval, and through a second circuit means to a second portion of the gas source during a variable time interval of at least the same duration as the fixed time interval. When apparatus of the latter type is used, the bag can be inflated during a time interval which varies in inverse proportion to the impact velocity of a vehicle in which such apparatus is disposed. The construction and operation of apparatus for inflating the bag during the aforesaid variable time interval is described in copending application Serial No. of Donald J. Lewis, filed of even date, which disclosure is specifically incorporated by reference.

Figure 2:
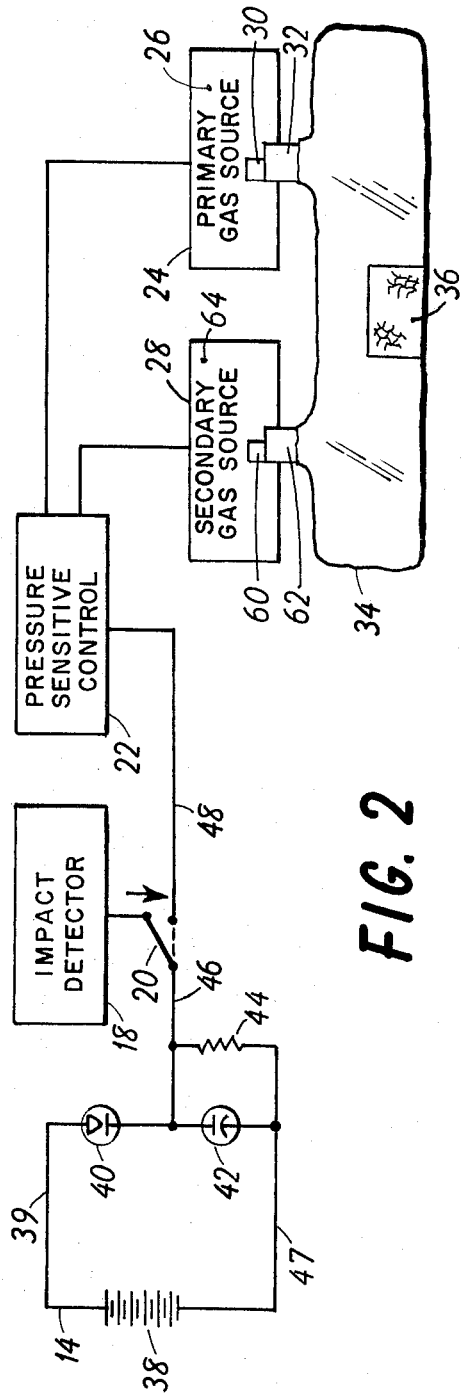
FIG. 2 is a schematic electrical diagram of the firing circuit of FIG. 1.

In FIG. 2 there is illustrated a schematic electrical diagram showing the firing circuit of FIG. 1. Upon application of voltage from battery 38, current 14 flows through line 39 and at least one diode 40 to capacitor 42. The resistance of resistor 44 is higher than the resistance of the uncharged capacitor 42. Accordingly, current 14 flows through and charges the capacitor 42. When the capacitor has been charged the resistance value of the resistor 44 is lower than the resistance of capacitor 42. Thus, the current passes through resistor 44 instead of capacitor 42 and returns to battery 38 through line 47. Diode 40 functions to prevent an external short circuit resulting from a collision, for example, from discharging capacitor 42 through line 39. The system will be more reliable if redundant diodes are connected in parallel in place of the single diode 40.

Normally, switch 20 is open and the current 14 is prevented from passing through line 46 and line 48 to the primary gas source. When a vehicle carrying apparatus 10 is involved in a collision, the impact detector 18 throws switch 20, which is connected to line 46 in the direction of the arrow and into contact with line 48. The current 14 flows from the power source 12 to pressure sensitive control 22 through a circuit means comprising a firing circuit 16 and lines 46 and 48, which have a lower resistance than the resistor 44. In the event that the battery 38 does not supply electrical power to the system, the capacitor 42 discharges through lines 46 and 48 of the circuit means to the pressure sensitive control 22. The current 14 is selectively directed by the pressure sensitive control 22 to either the primary gas source 24 or the secondary gas source 28 as will be described hereinafter in more detail.

In FIG. 3 there is illustrated the impact detection means of FIGS. 1 and 2. Such means may comprise at least one roller 50 of metal such as stainless steel, gold plated copper, or other suitable conductive material. The roller 50 is electrically connected to the power source 12 and moveably mounted on a nonconductive support 52, made, for example, of polycarbonate. A thin band of electrically conductive material 54, such as stainless steel, gold plated copper, or the like, wrapped around roller 50 and spot welded or otherwise secured to support 52, provides a resisting force against which the roller 50 acts. Conductive element 56, comprised of electroconductive material of the type used to make band 54 is fixedly mounted on support 52. If roller 50 is displaced along the surface 58 of platform 52 in the direction of the arrow, band 54 is brought into contact with the conductive element 56. The current 14 flows from the power source 12 through the firing circuit 16, line 46, switch 20 and line 48 to pressure sensitive control 22, which selectively directs the current 14 to a first gas releasing means.

The first gas releasing means includes a plug 32 removeably mounted in the housing 72 of primary gas source 24 and extending through a full thickness of the housing 72. An electroexplosive device comprised, for example, of a shape charge 30, is located adjacent to the plug 32. Resistance element 31 is structurally connected to the shape charge 30 and electrically connected to the circuit means and to ground 33. The shape charge 30 explodes upon receipt of the electrical current 14. The explosion dislodges plug 32, whereupon an outlet is created in the primary gas source 24. The outlet is in communication with an inflatable bag 34. Gas from the primary source 24 flows through the outlet and into bag 34, which is rapidly inflated by the gas. The gas pressure within the primary source 24 tends to decrease as the bag inflates. When the pressure of gas 26 within the primary gas source 24 is reduced by inflation of the bag to a preselected pressure, the pressure sensitive control 22 electrically connects the secondary gas source 28 with the circuit means.

The preselected pressure at which pressure sensitive control 22 electrically connects the secondary gas source 28 with the circuit means may, of course, vary with different gas source constructions, and gas supply means. A gas generating material which supplies, for example, 25 percent of a gas supply, excluding the solid combustion products, may provide as much as 75 percent of the systems pressurizing capability. Such preselected pressure may also depend upon the volume of gas required to inflate the air cushion. For a particular volume of gas stored under pressure or combination of a particular mass of gas generating material and volume of stored pressurized gas the pressure at which pressure sensitive control 22 directs current 14 from power source 12 and the circuit means to the secondary gas source can be calculated by analytical means. Such pressure may, for example, be the pressure below which a particular gas 26 if released from a gas source 24 would not fully inflate the bag 34.

In FIG. 4 there is illustrated a pressure sensitive control means for selectively directing current 14 from a power source and a circuit means to either a primary or a secondary gas source. Such control means may comprise a flexible electrically conductive tube 66 of copper, stainless steel, aluminum, plastic or other suitable material. One end 68 of tube 66 is open, and communicates with a pressurized gas 26 stored within a rigid housing 72 of primary gas source 24, so that a portion of the gas 26 enters the open end 68 and fills tube 66. The other end 70 of tube 66 is closed. Gas 26 from source 24 can freely flow into and out of tube 66 through the open end 68. As a result, the pressure of gas 26 within tube 66 is substantially the same as the pressure of gas 26 within the housing 72 of source 24. The tube 66, which may be of the bourdon tube variety, is especially constructed in the conventional way to assume an arcuate shape if the pressure of gas 26 within the tube 66 falls below a preselected minimum pressure. The closed end 70 of tube 66 is electrically connected to the circuit means by electrical means which comprise a line 48 attached to a thin strip 74 of electrically conductive material. The electrically conductive material encircles the closed end 70 of tube 66 and is electrically insulated from the tube 66 by a suitable insulating material 76. Preferably, at least two thin strips of the electrically conductive material separately encircle the end 70 of the tube 66. Line 48 electrically connects a first strip to the power source 12 and auxiliary power supply, while line 49 connects a second strip to a second auxiliary power supply. The second auxiliary power supply, not shown, can be constructed and operated in the same manner as but independently of the power source 12. The latter construction provides continued operation of the system in the event that the power source 12 and a first auxiliary power supply is not supplying electrical power thereto. If insulating material 76 does not effectively insulate strip 74 from the closed end 70 of tube 66, or if line 48 is directly connected to the closed end 70 of tube 66 without insulating material 76, the current 14 will be transmitted from power source 12 through the tube 66. Preferably, the metal housing 72 of gas source 24 is electrically insulated from the open end 68 of tube 66 by an insulating member 78, comprising material of the type used to make strip 74. Such insulating member 78 prevents current 14 from entering the housing 72 of gas source 24 through the open end 68 of tube 66.

When gas 26 is stored within housing 72 of primary gas source 24 at a pressure higher than the preselected minimum pressure, the tube is in a substantially straight position, such as the position shown by solid lines in FIG. 4. In this position, the thin strip 74 of electroconductive material encircling the closed end 70 of tube 66 contacts a first electroconductive member 80 comprised of stainless steel, gold plated copper, or the like. Lead wire 82 connects member 80 to shape charge 30 within primary gas source 24. Thus, upon impact of a vehicle equipped with apparatus 10, current 14 from power source 12 or the second auxiliary power source and firing circuit 16 is directed by impact detector 18 through line 48 or 49, as the case may be, strip 74, member 80 and lead wire 82 to shape charge 30 within primary gas source 24. When the pressure of gas 26 within the housing 72 of the primary gas source 24 falls below the aforementioned preselected minimum pressure, the pressure of the gas 26 within tube 66 is not sufficient to counteract forces tending to cause the tube 66 to assume an arcuate shape. Strip 74 is thus moved into contact with a second electroconductive member 84, which is electrically connected to shape charge 60 within secondary gas source 28 by lead wire 86. The arcuate shape, shown by broken lines in FIG. 4 may, of course, vary somewhat with different tube constructions. Upon impact of the vehicle, current 14 is transmitted in the above manner through line 48, strip 74, member 84 and lead wire 86 to shape charge 60 within secondary gas source 28.

An alternate pressure sensitive control means for selectively directing current 14 from a power source to the primary and secondary gas source is illustrated in FIG. 5. Such control means comprises a piston 88 having one end of a shaft 90 connected to a first major face 91 thereof. An electrically conductive element 97 is connected to the other end of the shaft 90 and is electrically insulated from the shaft 90 by an insulating element 99. The electrically conductive element is connected to line 94 which, in turn, is electrically connected to line 48 of the circuit means. The shaft 90 extends in the direction of an electroconductive component 92, which may comprise the same material used to make electroconductive members 80 and 84. The piston and the shaft may be respectively be comprised of copper, stainless steel, plastic, or other suitable material which has sufficient strength and rigidity to be slideably moved within housing 72 of primary gas source 24. Conductive component 92 is fixedly located relative to conductive element 97 such that displacement of piston 88 and shaft 90 toward the conductive component 92 electrically connects the conductive element 97 with the conductive component 92. One end 98 of a spring 96 is connected to the second major face 93 of piston 88. The other end 100 of the spring 96 is connected to the housing 72 of the primary gas source 24. Preferably, the spring 96 and the shaft 90 are connected respectively to the center portions of the faces 91 and 93 of shaft 88. Housing 72 can be constructed in a rectangular or cylindrical shape, as can piston 88. The outer edges of piston 88 are in continuous contact with the housing 72. Such contact or connection between piston 88 and housing 72 is sufficient to prevent gas 26 from passing from a compartment 102 created by housing 72 and face 91 of piston 88 to a compartment 104 created by housing 72 and face 93 of piston 88. The contact between the shaft 90 and the housing 72 continues during movement of the shaft 90 within the housing 72 as well as when the shaft 90 is in a position of rest. The spring exerts a sufficient force on face 93 of the piston 88 to displace the piston 88 toward the electroconductive component where the pressure of gas 26 stored within compartment 102 is below a preselected minimum pressure. If more than two gas sources are employed, each gas source can be connected in series with the power source as shown in FIG. 1. The last gas source of the series could be constructed in the same manner as the secondary gas source 28, of FIG.

6, i.e., without the spring 96, piston 88 and shaft 90. The other gas sources of the series could be constructed in the same manner as the primary gas source 24 of FIG. 6.

Normally, the pressure of gas 26 disposed within compartment 102 is sufficient to force piston 88 against spring 96, thereby compressing the spring. As the pressure of the gas 26 is reduced, the spring tends to force piston 88 and shaft 90 in the direction of conductive component 92. When the preselected minimum pressure obtains within the primary gas source 24, the shaft 90 moves a sufficient distance to bring conductive element 97 in contact with conductive component 92. An electrical connection is thereby created whereby the secondary gas source is placed in circuit with the power source 12.

As discussed in connection with FIGS. 1 and 2, the apparatus 10 includes a bag 34 which is inflated by gas 26 from primary gas source 24 upon impact of a vehicle in which the apparatus 10 is disposed. At least a portion 36 of the fabric comprising bag 34 is generally provided with sufficient porosity to permit some of the inflating gas which enters bag 34 to pass through the porous portion 36 and out of the bag 34. In this manner the bag can be made to collapse at a preselected rate. The bag is fully inflated and commences to collapse before contact with an occupant within the vehicle. Sufficient gas remains within the bag to prevent an occupant contacting the front of the bag from penetrating through the bag so as to contact hard portions of the vehicle on the reverse side of the bag. A "ride-down" effect is thereby provided whereby upon impact of the vehicle the occupant contacts a softer medium and decelerates at a slower rate of speed. Preferably, the bag should collapse with sufficient speed to provide the softest medium and the longest deceleration and yet retain sufficeint gas within to prevent an occupant or other mobile object forced against the front of the bag from contacting hard portions of the vehicle on the reverse side of the bag.

The rate at which the inflating gas passes through the porous portion 36 and out of bag 34 will depend in part upon the velocity of the vehicle upon impact, and the weight of a passenger or other mobile object forced against the bag 34. Higher impact velocities generally cause the bag to collapse at a faster rate. Moreover, at such higher impact velocities, the vehicle is more likely to become involved in a second impact. Advantageously, apparatus constructed in accordance with the present invention as hereinbefore described, can inflate and then collapse the bag at a relatively high speed so as to produce the aforesaid ride-down effect upon collision of a vehicle in which the apparatus is disposed, and subsequently reinflate and recollapse the bag to permit a second ride-down by the occupant or mobile object when the vehicle is involved in a second impact occuring shortly thereafter. In addition, the apparatus of this invention assures that a bag which has been inflated during a first impact of a vehicle equipped with the apparatus, contains sufficient gas to prevent an occupant or other mobile object from penetrating the bag in the aforesaid manner when the vehicle becomes involved in a second impact.

In operation, the current 14 is transmitted from power source 12 through the circuit means and pressure sensitive control 22 to shape charge 30 within the primary gas source 24 upon a first impact of the vehicle. The shape charge explodes and gas 26 flows from the primary gas source 24 into an inflatable bag 34 in the manner described above. When the pressure of gas within the primary gas source has been reduced by inflation of the bag to a preselected pressure, the pressure sensitive control 22 electrically connects the secondary gas source 28 with the circuit means.

Once inflated, the bag commences to collapse. Within a short time after the first impact has occurred, insufficient gas remains within the bag to prevent an occupant or other mobile object within the vehicle from penetrating through the bag and into contact with hard portions of the vehicle, as described above. When the vehicle becomes involved in a second impact, the impact detector 18 places line 46 in electrical communication with line 48. The electrical current 14 from power source 12 is transmitted through the circuit means and the pressure sensitive control 22, to shape charge 60 of secondary gas source 28. Resistance element 61 is structurally connected to the shape charge 60 and electrically connected to the circuit means and to ground 65. The shape charge 60 explodes upon receipt of the electrical current 14. Such explosion dislodges plug 62, whereby an outlet is created in the secondary gas source 28. The outlet communicates with bag 34. Gas 64 from the secondary gas source 28 flows through the outlet and into bag 34, which inflates to provide a shock absorbing medium between hard parts of the vehicle and passengers or other mobile objects disposed therein.

It should be apparent that depending upon the construction and operation of the primary gas source, the volume of gas needed to inflate the bag, and the volume of pressurized gas stored in the primary gas source, the bag 34 can be inflated or reinflated one or more times by gas 26 from the primary gas source before the gas pressure within such source 24 falls below the preselected minimum pressure. If sufficient gas 26 leaks from the primary gas source to bring the gas pressure therewithin below the aforementioned preselected minimum pressure, the bag 34 can be inflated for the first time by gas 64 from the secondary gas source 28. In the latter situation, if at least a tertiary gas source is employed, the secondary gas source 28 would function in the same manner as the primary gas source 24, and the tertiary gas source would function in the same manner as the secondary gas source 28.

As shown in FIG. 6, at impact of a vehicle in which apparatus 10 is disposed the current 14 from power source 12 and firing circuit 16 is directed by switch 20 of impact detector 18 through line 48 to shape charge 30, to effect the release of gas 26 from the primary gas source 24 in the manner described above. When the pressure of gas 26 within the primary gas source 24 reaches the preselected minimum pressure, the force exerted by spring 96 on piston 88 and shaft 90 moves line 94 into contact with conductive member 92. If the vehicle becomes involved in a second impact, the current is transmitted as above to line 48 and through line 94, conductive component 92 and line 106 to shape charge 60 adjacent plug 62 of secondary gas source 28. The charge 60 explodes, the plug 62 is dislodged, and the gas 26 flows through an outlet thereby created in the secondary gas source 28 to reinflate the bag 34.

The apparatus 10 which has been disclosed herein can, of course, be modified in numerous ways without departing from the scope of our invention. For example, in one embodiment of the invention, the gas source 30 may comprise a generated gas solely. In one aspect of this embodiment, for example, the normal position of tube 66 could be an arcuate shape wherein strip 74 of tube 66 could be an arcuate shape wherein strip 74 contacts an electroconductive member 80 electrically connected to shape charge 30 of primary gas source 24. Upon impact of a vehicle equipped with the apparatus, generation of gas within housing 72 of primary gas source 24 would creat sufficient pressure within tube 66 To cause the tube 66 to assume a substantially straight position. In this position, the thin strip 74 of electroconductive material would contact a second electroconductive member 84 electrically connected to shape charge 60 of secondary gas source 28. Latch means (not shown) could be connected, for example, to the second electroconductive member or to the housing 72 to retain contact between tube 66 and the second electroconductive member after release of the generated gas from the primary gas source 24. In another aspect of the invention, gas generated within compartment 104 of primary gas source 24 upon impact of the vehicle could displace the piston 88 and shaft 90 in the direction of electroconductive component 92 until the electricaly conductive element 97 becomes electrically connected with component 92. Latch means could be connected, for example, to component 92, to retain contact between element 97 and component 92 after release of the generated gas from the primary gas source 24. Either of these embodiments of the invention would provide for reinflation of the bag 34 upon a subsequent impact of the vehicle in the event that the gas source were to contain a gas generating material solely.

Having thus described our invention in rather full detail, it will be understood that these details need not be strictly adhered to but that various changes and modifications may suggest themselves to one skilled in the art. It is accordingly intended that all matter contained in the above description and shown in the accompanying drawings shall be interpreted as illustrative and not in a limiting sense.

We claim:

1. Apparatus for successively inflating a bag with gas from a plurality of gas sources disposed in a vehicle subject to a plurality of collisions, comprising:
   a. a power source for supplying an electrical current;
   b. circuit means connected to the power source, said circuit means including impact detecting means for causing the current to flow through the circuit means upon each impact of the vehicle;
   c. a primary gas source including pressurized gas;
   d. a secondary gas source for supplying a gas selected from the group consisting of pressurized gas, gas developed by combustion of gas generating material, and mixtures thereof;
   e. a first gas releasing means connected to the primary gas source and to the bag, and a second gas releasing means connected to the secondary gas source and to the bag, said first and second gas releasing means respectively permitting gas from the primary and secondary gas source to flow into the bag upon receipt of the electrical current; and
   f. a pressure sensitive control means, electrically connected to the circuit means, said pressure sensitive control means being in communication with said pressurized gas of said primary gas source so as to be continuously and directly responsive to the pressure of gas within the primary gas source, whereby said pressure sensitive control means electrically connects the first gas releasing means to the circuit means whenever the pressure of gas within the primary gas source is at least a preselected minimum pressure, and electrically connects the second gas releasing means to the circuit means only if and whenever the pressure of gas within the primary gas source is less than the preselected minimum pressure.

2. Apparatus as recited in claim 1, wherein the impact detecting means comprises a moveable electroconductive material connected to the power source and means for displacing said material against a preselected resisting force and into contact with an electroconductive element connected to the circuit means.

3. Apparatus as recited in claim 1, wherein the pressure sensitive control means comprises a flexible tube adapted for movement in response to gas pressure within the primary gas source, said tube having an open end in communication with pressurized gas within the primary gas source and a closed end connected by electrical means to the circuit means, the closed end of the tube in electrical contact with an electroconductive member connected to the first gas releasing means whenever the pressure of gas within the primary source is at least said preselected minimum pressure, and in electrical contact with an electroconductive member electrically connected to the second gas releasing means only if and whenever the pressure of gas within the primary source is less than the preselected minimum pressure.

4. Apparatus as recited in claim 3, wherein the primary gas source is comprised of a hollow housing, and the first gas releasing means comprises a plug moveably mounted in the housing, said plug extending through a full thickness of the housing and into contact with the pressurized gas, an explosive charge located adjacent to the plug, and a resistance element structurally connected to the explosive charge and electrically connected to the circuit means prior to an impact of the vehicle, for exploding the charge upon passage of the current through the resistance element whereby the plug is removed from the housing.

5. Apparatus as recited in claim 3, wherein the secondary gas source is comprised of a hollow housing, and the second gas releasing means comprises a plug moveably mounted in the housing, said plug extending through a full thickness of the housing, an explosive charge located adjacent to the plug, and a resistance element structurally connected to the explosive charge and electrically connected to the circuit means after the impact of the vehicle, for exploding the charge upon passage of the current through the resistance element whereby the plug is removed from the housing.

6. Apparatus as recited in claim 3 which has associated therewith an auxiliary power supply.

7. Apparatus as recited in claim 6, wherein the electrical means includes a first and second strip, each strip comprised of electrically conductive material separately encircling the closed end of the tube and electrically insulated from the tube by an insulating material, the first strip electrically connected with the power source and the second strip electrically connected with a secondary auxiliary power supply.

8. Apparatus as recited in claim 7, wherein the circuit means includes a firing circuit electrically connected to the power source and to the impact detecting means.

9. Apparatus as recited in claim 8, wherein the auxiliary power supply is a capacitor, the power source is a battery, and the firing circuit includes the capacitor connected in parallel with the battery and a diode electrically connected between the battery and the capacitor, and in series with the battery and the impact detecting means.

10. Apparatus as recited in claim 9, wherein the diode comprises redundant diodes connected in parallel.

11. Apparatus as recited in claim 9, including a tertiary gas source, a third gas releasing means connected thereto, for permitting gas from the tertiary gas source to flow into the bag and a second pressure sensitive control means structurally connected to the secondary gas source, electrically connected to the circuit means, and responsive to the pressure of gas within the secondary gas source, said pressure sensitive control means electrically connecting the second gas releasing means to the circuit means prior to the second impact of the vehicle, and electrically connecting the third gas releasing means to the circuit means after the second impact.

12. Apparatus as recited in claim 1 wherein the primary gas source further includes gas generating material and is comprised of a hollow housing, and the pressure sensitive control means comprises a flexible tube adapted for movement in response to gas pressure within the primary gas source, and said tube extends through a full thickness of the housing and into contact with said pressurized gas.

13. Apparatus for successively inflating a bag with gas from a plurality of collisions, comprising:
  a. a power source for supplying an electrical current;
  b. circuit means connected to the power source, said circuit means including impact detecting means for causing the current to flow through the circuit means upon each impact of the vehicle;
  c. a primary gas source for supplying a gas at a preselected minimum pressure, said gas selected from the group consisting of pressurized gas and pressurized gas mixed with gas developed by combustion of gas generating material;
  d. a secondary gas source for supplying a gas selected from the group consisting of pressurized gas, gas developed by combustion of gas generating material, and mixtures thereof;
  e. a first gas releasing means electrically connected to the circuit means and structurally connected to the primary gas source and to the bag, and a second gas releasing means connected to the secondary gas source and to the bag, said first and second gas releasing means respectively permitting gas from the primary and secondary gas source to flow into the bag upon receipt of the electrical current; and
  f. pressure sensitive control means, electrically connected to the circuit means, said pressure sensitive control means being in communication with said pressurized gas of said primary gas source so as to be continuously and directly responsive to the pressure of gas within the primary gas source, and electrically connecting the second gas releasing means to the circuit means only if and whenever the pressure of gas within the primary gas source is less than a preselected minimum pressure.

14. Apparatus as recited in claim 13, wherein the control means includes means for moving an electrically conductive element electrically connected to the circuit means into electrical contact with an electrically conductive component electrically connected to the second gas releasing means.

15. Apparatus as recited in claim 14, wherein the electrically conductive element is moved into contact with the electrically conductive component by means which comprise a piston disposed within a hollow housing and slideably moveable therewithin, the peripheral edges of the piston in continuous contact with the housing, said piston connected on a first side to one end of a shaft extending toward the electrically conductive component and on a second side to one end of a spring, the other end of the spring connected to the housing so that the spring is compressed when the piston and the shaft are displaced toward the spring, the electrically conductive element connected to the other end of the shaft and electrically insulated therefrom by an insulating element, said conductive component located relative to said conductive element such that displacement of the shaft toward the conductive component electrically connects the conductive element with the conductive component, a pressurized gas within a compartment formed by the first side of the piston and the housing displacing the piston in the direction of the spring, and means for releasing the pressurized gas from the compartment upon receipt of the electrical current.

16. Apparatus as recited in claim 15, wherein the pressurized gas is released from the compartment by the first gas releasing means.

17. Apparatus as recited in claim 16 wherein the pressurized gas is released from the compartment by means which comprise a plug removeably mounted withing the housing, said plug extending through a full thickness of the housing and into contact with the pressurized gas, an explosive charge located adjacent to the plug, and a resistance element structurally connected to the explosive charge and electrically connected to the circuit means, for exploding the charge upon passage of the current through the resistance element, whereby the plug is removed from the housing.

18. Apparatus as recited in claim 17, wherein an outlet is provided in the housing by removal of the plug, said outlet being in communication with the pressurized gas and with an inflatable bag, and gas flows from the compartment through the outlet and into the inflatable bag.

19. Apparatus as recited in claim 17, wherein the secondary gas source comprises a hollow housing, a plug moveably mounted within the housing, said plug extending through a full thickness of the housing and into contact with a pressurized gas within the housing, an explosive charge located adjacent to the plug, and a resistance element structurally connected to the explosive charge and electrically connected to the circuit means, for exploding the charge when the current flows through the resistance element, thereby the plug is removed from the housing.

20. Apparatus as recited in claim 19, wherein an outlet is provided in the housing by removal of the plug, said outlet being in communication with the pressurized gas and with an inflatable bag, whereby gas flows from within the housing through the outlet and into the inflatable bag.

21. Apparatus as recited in claim 20, wherein the secondary gas source additionally comprises means for moving an electrically conductive element electrically connected to the circuit means into electrical contact with an electrically conductive component electrically connected to a tertiary gas source.

22. Apparatus as recited in claim 20, wherein the impact detecting means comprises a moveable electroconductive material connected to the power source and means for displacing said material against a preselected resisting force and into contact with an electroconductive element connected to the circuit means.

23. Apparatus as recited in claim 22, which has associated therewith an auxiliary power supply.

24. Apparatus as recited in claim 23, wherein said auxiliary power supply means includes a firing circuit electrically connected to the power source and to the impact detecting means.

25. Apparatus as recited in claim 24, wherein the firing circuit includes a capacitor connected in parallel with the battery and at least one diode electrically connected between the battery and the capacitor, and in series with the battery and the impact detecting means.

26. Apparatus as recited in claim 19, wherein the electrically conductive element is moved into contact with the electrically conductive component by means which comprise a piston disposed within a hollow housing and slideably moveable therewithin, the peripheral edges of the piston in continuous contact with the housing, said piston connected on a first side to one end of a shaft extending toward the electrically conductive component, the electrically conductive element connected to the other end of the shaft and electrically insulated therefrom by an insulating element, said conductive component located relative to said conductive element such that displacement of the shaft toward the conductive component electrically connects the conductive element with the conductive component, a gas generating material within a compartment formed by the second side of the piston and the housing, said gas generating material electrically connected to the circuit means, and means for releasing gas developed by combustion of the gas generating material from the housing.

27. Apparatus as recited in claim 16, wherein the distance that the shaft is displaced toward the electrically conductive component is inversely proportionate to the pressure of the gas within the compartment.

28. Apparatus as recited in claim 16, wherein the conductive element is electrically connected to the conductive component when the pressure of gas within the compartment is below said preselected minimum pressure.

* * * * *